United States Patent Office 3,535,083
Patented Oct. 20, 1970

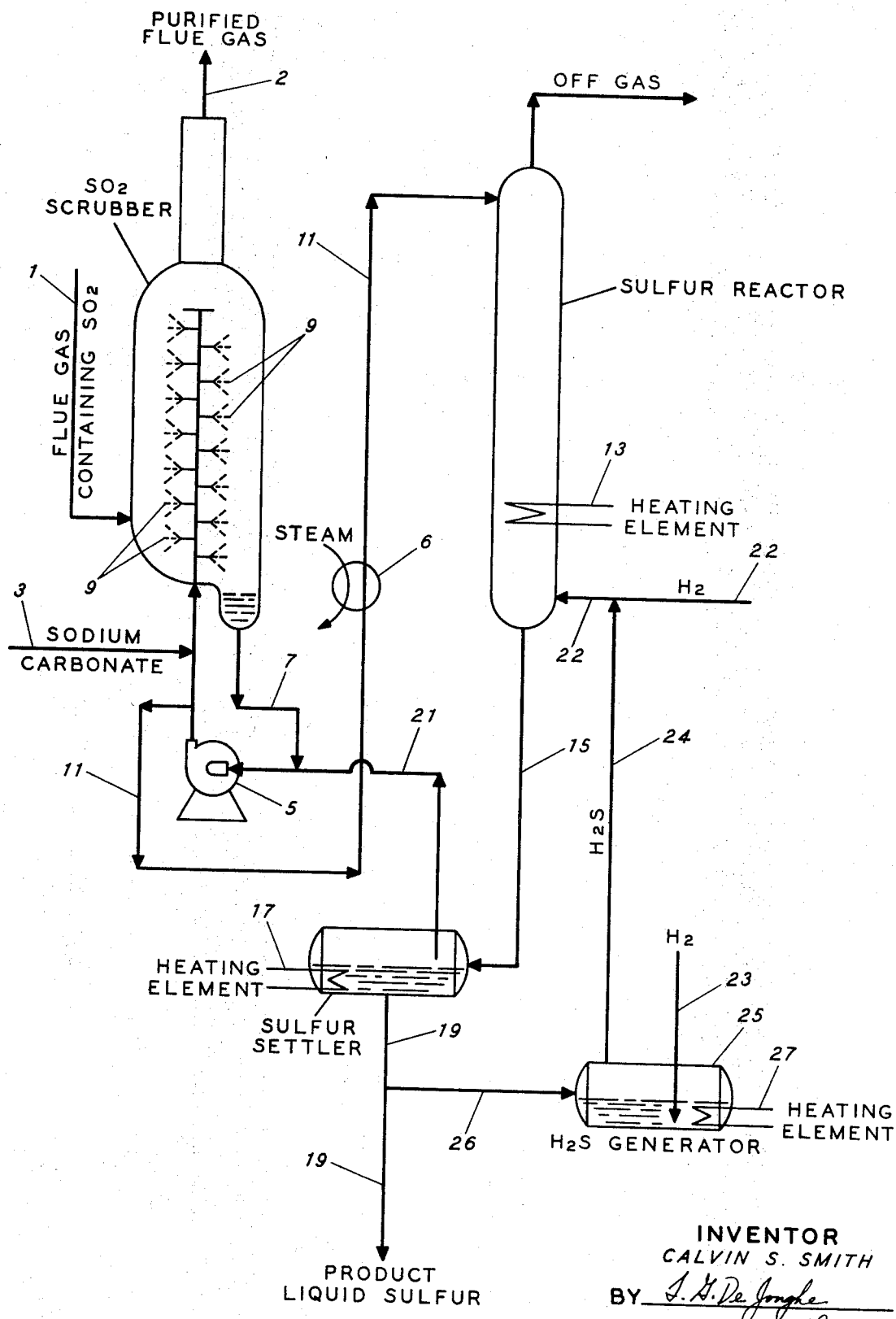

3,535,083
GAS PURIFICATION
Calvin S. Smith, El Cerrito, Calif., assignor to Chevron Research Company, San Francisco, Calif., a corporation of Delaware
Continuation-in-part of application Ser. No. 693,604, Dec. 26, 1967. This application Apr. 17, 1969, Ser. No. 817,004
Int. Cl. C01b 17/04
U.S. Cl. 23—225
1 Claim

ABSTRACT OF THE DISCLOSURE

Process for removing $SO_2$ from flue gas and producing sulfur wherein an aqueous solution of alkali sulfite is used to scrub $SO_2$ from the flue gas and the resulting alkali hydrosulfite is reacted with $H_2S$ to regenerate alkali sulfide aqueous scrubbing solution and to produce elemental sulfur. The $H_2S$ is formed by reacting $H_2$ with part of the sulfur produced in the process.

CROSS-REFERENCE

This application is a continuation-in-part of application Ser. No. 693,604, filed Dec. 26, 1967, which application is incorporated by reference into the present application.

BACKGROUND OF THE INVENTION

Field of the invention

This invention relates to the purification of gases such as are created in industry and in which sulfur is present as $SO_2$. More particularly, it relates to the removal of $SO_2$ from flue gases containing $SO_2$ and to the production of sulfur.

Description of the prior art

A great deal of work has been done on processes for removing $SO_2$ from the stack gas. Several processes are now being considered in this country and abroad since fuel desulfurization (e.g., catalytic hydrodesulfurization) does not appear to be a complete answer at this time. Most advanced of these are: (1) the Reinluft process, (2) the alkalized alumina process (Bureau of Mines), and (3) the catalytic oxidation process (Pennsylvania Electric-Monsanto).

The above three processes suffer from disadvantages of high capital or operating costs, as well as remaining technical problems. A process which has been suggested which is akin to the present invention is the sodium sulfite-zinc oxide process (Johnstone-Singh process).

At the University of Illinois, Professor Johnstone developed a cyclic process in which flue gas is scrubbed with aqueous solutions of sodium sulfite forming $NaHSO_3$. The scrubbing liquor is clarified and treated with ZnO. The zinc oxide reacts with the $NaHSO_3$, giving insoluble zinc sulfite crystals, which are filtered off, dried, milled, and calcined in a flash calciner from which a gas containing 70 percent water and 30 percent sulfur dioxide is driven off. The gas is cooled, dried and liquefied. The filtrate separated from the zinc sulfite slurry constitutes the regenerated liquor and is pumped back to the absorber for further sulfur dioxide removal. The calcined zinc oxide is returned to the clarified spent solution. Oxidation of the sulfite radical to the sulfate is known to occur in the scrubber and in the calciner. Sulfate formation appears to be caused by contact of sulfite with oxygen rather than by any autoxidation type of side reaction. The accumulation of dissolved sulfate radical in the liquor is harmful to the process because it does not absorb sulfur dioxide and cannot be regenerated in the zinc oxide system; therefore, a desulfating system is needed to remove sulfate ions. A side stream of spent liquor is fed to the desulfating system to remove the sulfate formed.

An obvious disadvantage of the above process is that extensive processing is involved. Filtration of the insoluble zinc sulfite crystals is a relatively difficult and costly operation. In addition, the magnitude of chemical losses in large-scale operation is not known. However, it is known that losses occur due to oxidation of $ZnSO_3$ to $ZnSO_4$, which is soluble in water. Also, if HCl is present in the flue gas, soluble $ZnCl_2$ is formed. Operating costs have also been shown by studies to be high.

SUMMARY OF THE INVENTION

According to the present invention, a process is provided for removing $SO_2$ from $SO_2$-containing gases, such as flue gases, and producing sulfur which process comprises:

contacting the gas containing $SO_2$ with an aqueous alkali sulfite scrubbing solution in a scrubbing zone to obtain an $SO_2$-rich solution;
withdrawing gas having a reduced sulfur dioxide content from the scrubbing zone;
withdrawing the $SO_2$-rich solution from the scrubbing zone and contacting it with hydrogen to precipitate sulfur;
separating precipitated sulfur from the solution;
and then returning at least a part of the solution to the scrubbing zone for contacting the gas containing sulfur dioxide.

By "$SO_2$-rich solution" is meant the solution resulting from contacting the flue gas with the aqueous alkali sulfite scrubbing solution. Usually the majority of the $SO_2$ will react to form a hydrosulfite in the solution. However, at least a small part of the $SO_2$ typically physically dissolves in the scrubbing solution, and a portion of the $SO_2$ will chemically react to form various compounds in the solution in addition to the hydrosulfite. For ease of nomenclature the solution is called simply "$SO_2$-rich solution".

In a preferred embodiment of the present invention, a wet scrubber is provided for contacting the $SO_2$ containing combustion effluent gases with an aqueous sodium sulfite solution. $SO_2$ reacts with the sodium sulfite to produce sodium hydrosulfite (also known as sodium bisulfite) by the following chemical reaction:

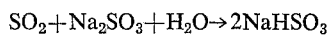
$$SO_2 + Na_2SO_3 + H_2O \rightarrow 2NaHSO_3$$

The sodium sulfite solution is circulated to the wet scrubber in large quantities. A smaller side stream is transferred to a sulfur reactor at a rate adjusted to control pH of $Na_2SO_3$ scrubbing solution. Preferably the wet scrubber is a cyclonic spray wash tower, which has high efficiency for scrubbing $SO_2$ from gases, particularly down to very low $SO_2$ concentrations with low pressure drop.

Sulfur is formed and precipitated by hydrogen in the process of the present invention due to reactions between hydrogen and chemical species in the $SO_2$-rich solution. In one preferred embodiment of the present invention, these reactions occur in one vessel, which may be called the sulfur reactor. The detailed chemistry is complex, but sulfur is believed to be formed according to one or more of the overall following reactions:

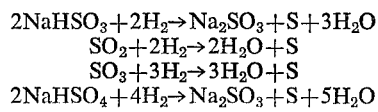
$$2NaHSO_3 + 2H_2 \rightarrow Na_2SO_3 + S + 3H_2O$$
$$SO_2 + 2H_2 \rightarrow 2H_2O + S$$
$$SO_3 + 3H_2 \rightarrow 3H_2O + S$$
$$2NaHSO_4 + 4H_2 \rightarrow Na_2SO_3 + S + 5H_2O$$

The exact mechanism of the sulfur reaction is not known but can proceed through an intermediate step in which $H_2S$ is generated according to the well known reaction:

$$H_2 + S \rightarrow H_2S$$

Thus $H_2S$ is formed due to the presence of hydrogen in the sulfur reactor, and the $H_2S$ reacts with hydrosulfite and hydrosolfates to prodlce sulfur according to the reactions:

$$2NaHSO_3 + 2H_2S \rightarrow Na_2SO_3 + 3S + 3H_2O$$
$$2NaHSO_4 + 4H_2S \rightarrow Na_2SO_3 + 5S + 5H_2O$$

Alternatively, instead of introducing only hydrogen to the sulfur reactor vessel, a mixture of $H_2$ and $H_2S$ (generated by reaction of $H_2$ with sulfur or other constituents present in the overall operating process) may be introduced to the sulfur reactor.

In accordanec with one preferred embodiment of the present invention, $H_2S$ is generated from $H_2$ and a portion of the precipitated sulfur in a separate vessel, and then the $H_2S$ is introduced to the sulfur reactor for reaction with sodium hydrosulfite to produce sulfur.

Hydrogen used directly or indirectly in the process of the present invention is obtained as a waste gas, as for example, from a catalytic reforming unit, or is generated according to well-known processes such as steam reforming or partial oxidation. Preferably a relatively small steam reforming unit is used to generate, from steam and light hydrocarbons, a hydrogen-carbon dioxide gas mixture. The $CO_2$ may be completely removed from the hydrogen, but preferably the amount of $CO_2$ in the hydrogen gas mixture is adjusted so as to aid in controlling pH in the sulfur reactor. The hydrogen reducing gas mixture may also be comprised of hydrogen and carbon monoxide.

A particular advantage of the present process is the regeneration of the sodium sulfite solution required to scrub $SO_2$ by the reaction that is used to produce sulfur in the sulfur reactor. This results in an overall economical and efficient operation.

In the process according to the present invention, processing conditions can be adjusted so that by-products $Na_2SO_4$ or $NaHSO_4$ are continuously regenerated, thereby making it unnecessary to "bleed" reagent from the system. When the flue gas is contacted with aqueous alkali sulfite scrubbing solution, a slow reaction of oxygen in the flue gas with sulfite takes place:

$$Na_2SO_3 + \tfrac{1}{2}O_2 \rightarrow Na_2SO_4$$

In most competitive processes, such as the ZnO process cited previously, and processes which steam strip $NaHSO_3$ to recover $SO_2$, sulfate buildup is a major problem requiring bleed streams which are themselves pollution problems.

In the process of the present invention, sulfur is recovered as elemental sulfur rather than as a sulfur compound. This affords an advantage over recovery of sulfur as $CaSO_3$, $CaSO_4$, $SO_2$, $(NH_4)_2SO_4$ or weak $H_2SO_4$.

This invention is particularly advantageously applied to the removal of $SO_2$ in flue gases resulting from burning fuel oils containing sulfur. In burning such fuel oils, there is a serious $SO_2$ pollution problem and little problem with fly ash as is the case in burning coal.

Although some specific principal reactions are given above for the invented overall process, it is to be understood that the reactions given are illustrative of the invention and are not limiting. The invention resides largely in the use of an alkali sulfite solution for removing $SO_2$ from combustion effluent gases with cyclic regeneration of the alkali sulfite scrubbing solution with simultaneous sulfur production.

The pH in the lower part of the sulfur reactor is preferably maintained within the range of 1 to 7, and still more preferably maintained within the range of about 3 to 7. It is generally necessary to maintain the pH below about 6 in order to induce relatively rapid formation of sulfur in the sulfur reactor. At high pH, sodium thiosulfate ($Na_2S_2O_3$) is formed by the reaction of sodium sulfite and sulfur. If sodium thiosulfate is obtained, it can be decomposed to sulfur and sodium sulfite by reducing the pH to about 5. If the pH is maintained below about 6 to 7, sodium sulfite or hydrogen sulfide plus sodium thiosulfate will react reasonably fast to give sulfur and water plus sodium sulfite. If the pH is too high in the sulfur reactor, the sulfur tends to go back into solution, for example as sodium thionates and polysulfides; and there is insufficient precipitation of sulfur to make the process economical. Although it is desirable to maintain the pH relatively low in the sulfur reactor to speed up the formation of sulfur, it is also desirable to avoid very low pH's because of increased corrosion problems and undesired side reactions.

In the present invention, the sulfur reactor is maintained at a temperature above the melting point of sulfur (204–235° F.). Preferably the temperature is maintained above about 240° F., which not only results in the precipitated sulfur being liquid but also the relatively high temperature results in degradation of polysulfides and thioacids to desired sulfur. When primarily or only hydrogen is introduced to the sulfur reactor, it is preferable to maintain the temperature above 240° F., for example at about 500° F. or even as high as 1000° F., to speed up the reaction of hydrogen with sulfur to form hydrogen sulfide.

According to the present invention, the solution pH in both the scrubber and reactor is quite critical. Maintaining the reasonably high pH improves the $SO_2$ scrubbing step and results in lower corrosion in the $SO_2$ scrubber. However, reaction of the alkali with $CO_2$ in the gas being scrubbed is not desired and this occurs at higher pH. The pH in the $SO_2$ scrubber is preferably maintained between 4 and 9, and still more preferably between about 4 and 6. The circulating solution contains both $SO_3^=$ ions and $HSO_3^-$ ions and is, therefore, strongly buffered resulting in easy pH control in this range and a substantial capacity of the solution to move sulfur from the scrubber to the sulfur reactor.

In the sulfur reactor, if the pH is too high, thiosulfates, polysulfides or sodium thionates keep the sulfur in solution and there is a tendency for the solution to have a foul odor. For example, when a sodium sulfide solution is added to a sodium sulfite solution, the resulting reaction mix is a solution which has a foul smell. When the pH is reduced with $SO_3$ to about 5–6, sulfur is precipitated and the odor is absent; and this seems to occur suddenly at a pH within the range 5 to 7. Experimental work indicates, however, that the pH preferably is not lowered below about 4 to achieve efficient $SO_2$ scrubbing but yet to eliminate or minimize $SO_2$ odors in the $SO_2$ scrubber effluent gas.

BRIEF DESCRIPTION OF THE DRAWING

The drawing is a process flow diagram schematically showing the overall process for removal of $SO_2$ from flue gas and production of sulfur.

DETAILED DESCRIPTION OF THE DRAWING

Referring now in more detail to the drawing, flue gas containing $SO_2$ is introduced to the $SO_2$ scrubber via line 1. Preferably a cyclonic spray washer is used to effect the scrubbing of $SO_2$ from the combustion effluent gas, and the drawing schematically depicts a cyclonic spray washer. Using this type of washer, the flue gas is introduced tangentially so as to result in a cyclone motion in the $SO_2$ scrubber. As the flue gas rises in a generally circularly swirling motion upward, it is intimately contacted with an aqueous sodium sulfite solution, sprayed radially outward from nozzles located in the central portion of the $SO_2$ scrubber. Other aqueous alkali solutions may be used for the scrubbing, such as ammonium sulfite but sodium sulfite is preferred. The $SO_2$ is absorbed into the aqueous solution and reacts to form sodium hydrosulfite. Because of highly efficient contacting of the flue gas with the aqueous solution in the $SO_2$ scrubber, and because the equilibrium vapor pressure of $SO_2$ above $Na_2SO_3$ and $NaHSO_3$ solution is low, a high recovery of $SO_2$ in the flue gas is achieved.

To establish and maintain adequate sodium concentration in the circulating solution, sodium carbonate solution is added to the aqueous scrubbing solution via line 3. The sodium carbonate also is a good $SO_2$ scrubbing agent in itself and reacts according to the reaction:

$$SO_2 + 2Na_2CO_3 + H_2O \rightarrow 2NaHCO_3 + Na_2SO_3$$

The $NaHCO_3$ further reacts with $SO_2$ to yield $$Na_2SO_3 + CO_2$$

Although $Na_2CO_3$ is shown in the drawing as the source of makeup sodium, other sources may be used. For example, it is advantageous to use certain foul water streams present in refinery or chemical plants. Particularly, when aqueous NaOH is used to scrub $H_2S$ out of LPG gas, the resulting sodium sulfide solution may be used for sodium makeup. In using such a sodium sulfide stream, it is preferable to add the sodium sulfide to the sulfur reactor system.

In order to provide for large quantities of aqueous sodium sulfite solution used to effect the scrubbing, pump 5 is used to recirculate the aqueous sodium sulfite solution via line 7 to the spray nozzles in the $SO_2$ scrubber, some of which are indicated by numeral 9. A side stream of the scrubbing solution is withdrawn in line 11. This side stream operates to transfer the sodium hydrosulfite solution to the sulfur reactor for conversion of the hydrosulfite to sulfite thus regenerating the sodium sulfite scrubbing solution and maintaining control of the pH of the scrubbing solution used in the $SO_2$ scrubber.

The aqueous solution of sodium hydrosulfite in line 11 is passed to the top of the sulfur reactor. This aqueous solution is heated by the hot flue gases which enter the $SO_2$ scrubber at a temperature of about 200–400° F. Also, the sodium sulfite solution is heated in heater 6 to between 220 to 500° F. before entering the sulfur reactor. In the sulfur reactor the sodium hydrosulfite reacts with hydrogen and/or generated hydrogen sulfide introduced via line 22 to form sodium sulfite as well as to produce sulfur. Using only hydrogen, the reaction may be given as:

$$2H_2 + 2NaHSO_3 \rightarrow S + Na_2SO_3 + 3H_2O$$

Using only generated $H_2S$, the reaction may be given as:

$$2H_2S + 2NaHSO_3 \rightarrow Na_2SO_3 + 3S + 3H_2O$$

In order to prevent solid sulfur from clogging up the lines out of the bottom of the sulfur reactor, heating element 13 is used to maintain the temperature above the melting point of sulfur, about 220° F. Pressure for the sulfur reactor is thus above atmospheric pressure, as required to suppress water rejuvenation. The precipitated sulfur and regenerated sodium sulfite solution are withdrawn together in line 15 from the bottom of a sulfur reactor and introduced into the sulfur settler. Heating element 17 is used to insure fluidity of the sulfur which settles in the sulfur settler.

Alternatively $H_2S$ can be generated in a separate vessel, reactor 25, by reacting hydrogen and sulfur. Temperature is maintained relatively high, for example 700° F., in reactor 25 so that $H_2S$ is separately generated from $H_2$ introduced via line 23.

Product liquid sulfur is withdrawn from the process via line 19. Aqueous sodium sulfite which, of course, will have an equilibrium amount of sodium hydrosulfite and other constituents, is withdrawn in line 21 from above the sulfur in the sulfur settler as an aqueous phase lighter than the precipitated liquid sulfur. The regenerated sodium sulfite solution is then recycled to the $SO_2$ scrubber via pump 5 to form a continuous loop for the scrubbing of $SO_2$. It will be noted that the typical principal reactions:

$$SO_2 + Na_2SO_3 + H_2O \rightarrow 2NaHSO_3$$

and $$2NaHSO_3 + 2H_2S \rightarrow Na_2So_3 + 3S + 3H_2O$$

or $$2NaHSO_3 + 2H_2 \rightarrow Na_2So_3 + S + 3H_2O$$

can be added to result in an overall reaction for the invented process; namely, $$SO_2 + 2H_2S \rightarrow 3S + 2H_2O$$

or $$SO_2 + 2H_2 \rightarrow 3H_2O + S$$

respectively. Thus, in the present invention, sodium sulfite is used to concentrate the $SO_3$ in an aqueous phase and to transfer the $SO_2$ from flue gas to a reaction system for the production of sulfur.

Although various specific embodiments of the invention have been described and shown, it is to be understood that they are meant to be illustrative only and not limiting. Certain features may be changed without departing from the spirit or essence of the invention. It is apparent that the invention has broad application to the scrubbing of various gas streams containing $SO_2$. Accordingly, the invention is not to be construed as limited to the specific embodiments illustrated but only as defined in the following claim.

What is claimed is:

1. A process for removing sulfur dioxide from gases containing $SO_2$ which comprises:

contacting the gas containing $SO_2$ with an aqueous alkali metal sulfite or ammonium sulfite scrubbing solution in a scrubbing zone to obtain an $SO_2$-rich solution;

withdrawing gas having a reduced sulfur dioxide content from the scrubbing zone;

withdrawing the $SO_2$-rich solution from the scrubbing zone and contacting it with hydrogen gas to precipitate sulfur;

separating precipitated sulfur from the solution;

and then returning at least a part of the solution to the scrubbing zone for contacting the gas containing sulfur dioxide.

References Cited

UNITED STATES PATENTS

| | | | |
|---|---|---|---|
| 2,876,071 | 3/1959 | Updegraff | 23—181 |
| 1,955,722 | 4/1934 | Ahlqvist | 23—226 |

FOREIGN PATENTS

| | | |
|---|---|---|
| 599,073 | 3/1948 | Great Britain. |

OSCAR R. VERTIZ, Primary Examiner

G. O. PETERS, Assistant Examiner

PO-1050
(5/69)

UNITED STATES PATENT OFFICE
CERTIFICATE OF CORRECTION

Patent No. 3,535,083      Dated October 10, 1970

Inventor(s) CALVIN SMITH

It is certified that error appears in the above-identified patent and that said Letters Patent are hereby corrected as shown below:

Col. 4, line 50, "$SO_3$" should read --$SO_2$--.

Col. 6, line 26, "$SO_3$" should read --$SO_2$--.

Signed and sealed this 11th day of May 1971.

(SEAL)
Attest:

EDWARD M. FLETCHER, JR.
Attesting Officer

WILLIAM E. SCHUYLER, JR.
Commissioner of Patents